United States Patent [19]

Takada

[11] Patent Number: 5,625,769

[45] Date of Patent: Apr. 29, 1997

[54] APPARATUS FOR AND METHOD OF GENERATING A STRAIGHT LINE AND SELECTING LATTICE POINTS FOR DISPLAY

[75] Inventor: Shuichi Takada, Osaka, Japan

[73] Assignee: Matsushita Electric Industrial Co., Ltd., Osaka, Japan

[21] Appl. No.: 253,402

[22] Filed: Jun. 3, 1994

[30] Foreign Application Priority Data

Jun. 24, 1993 [JP] Japan .................................. 5-153843

[51] Int. Cl.$^6$ .................................................. G06T 11/20
[52] U.S. Cl. .......................................................... 395/143
[58] Field of Search ............................ 395/132, 141–143

[56] References Cited

U.S. PATENT DOCUMENTS

| | | | |
|---|---|---|---|
| 4,479,192 | 10/1984 | Yamagami | 395/143 |
| 4,593,372 | 6/1986 | Bandai et al. | 395/132 |
| 4,837,563 | 6/1989 | Mansfield et al. | 395/143 |
| 5,136,689 | 4/1992 | Wallier | 395/143 |
| 5,146,551 | 9/1992 | Miyazawa | 395/142 |
| 5,167,015 | 11/1992 | Bair et al. | 395/143 |
| 5,287,442 | 2/1994 | Alcorn et al. | 395/143 |
| 5,305,432 | 4/1994 | Kubota | 395/143 |
| 5,309,553 | 5/1994 | Mukai et al. | 395/143 |
| 5,422,991 | 6/1995 | Fowler | 395/143 |
| 5,432,898 | 7/1995 | Curb et al. | 395/143 |
| 5,570,463 | 10/1996 | Dao | 395/143 |

FOREIGN PATENT DOCUMENTS

| | | |
|---|---|---|
| 305034 | 3/1989 | European Pat. Off. . |
| 4260982 | 9/1992 | Japan . |

OTHER PUBLICATIONS

Foley et al., *Computer Graphics Principles and Practice*, Second Edition, Addison–Wesley Publishing Company (1990), pp. 67–101.

"Polarized Raster Ling Algorithm Introduction", IBM Technical Disclosure Bulletin, vol. 36, No. 09B, Sep. 1993.

"Basic Concepts to Accelerate Line Algorithms", by G. Casciola, 2388 Computer & Graphics, 12(1988) No. 3/4, pp. 489–502 Headington Hill Hall, Oxford, GB.

*Primary Examiner*—Heather R. Herndon
*Assistant Examiner*—Joseph R. Burwell
*Attorney, Agent, or Firm*—Price, Gess & Ubell

[57] ABSTRACT

In an apparatus and method for generating a straight line using the Bresenham algorithm, when the XY coordinates of a start point and an end point of the line are given, the lattice point to be displayed can be freely selected when the desired straight line passes directly between two lattice points. A reference coordinate determination means determines a reference coordinate and a judge coordinate based on the differences in absolute values between the X coordinates of the start and end points, and the Y coordinates of the start and end points. The Bresenham values are calculated and a constant input means selectively inputs one of two constants, the inputted constant indicating which one of the two lattice points is to be displayed when the desired line passes at a midpoint of the two lattice points. Further, a constant registration means registers the constant according to each of eight combinations, such that $2^8$ (256) lines can be drawn. Any lattice point designation by external hardware or software is detected such that the lattice point selected for display can be compatible with the external hardware or software lattice point selections.

19 Claims, 13 Drawing Sheets

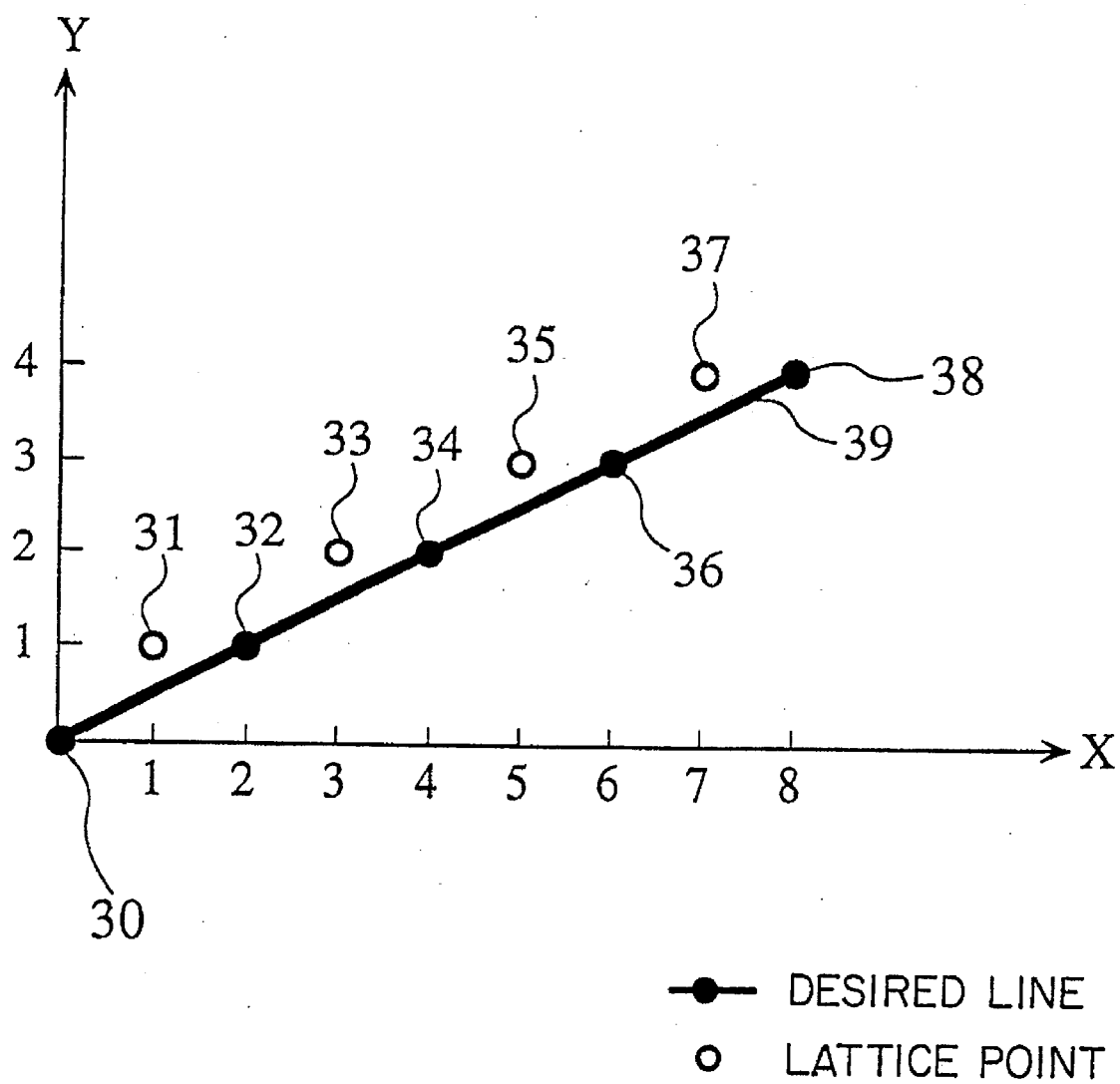

|     | XI | YI | XY | SW |
|-----|----|----|----|----|
| SW1 | 1  | 1  | 0  | 1  |
| SW2 | 1  | 1  | 1  | 0  |
| SW3 | -1 | 1  | 1  | 0  |
| SW4 | -1 | 1  | 0  | 0  |
| SW5 | -1 | -1 | 0  | 1  |
| SW6 | -1 | -1 | 1  | 1  |
| SW7 | 1  | -1 | 1  | 1  |
| SW8 | 1  | -1 | 0  | 0  |

71, 72, 73, 74, 75, 76, 77, 78

Fig. 13A
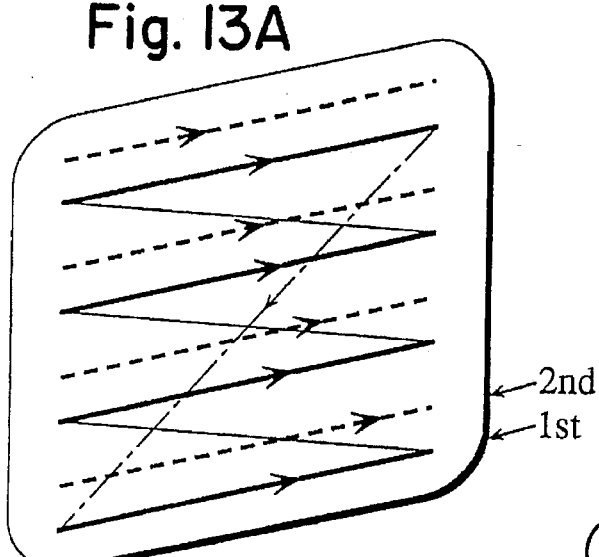
Fig. 13B
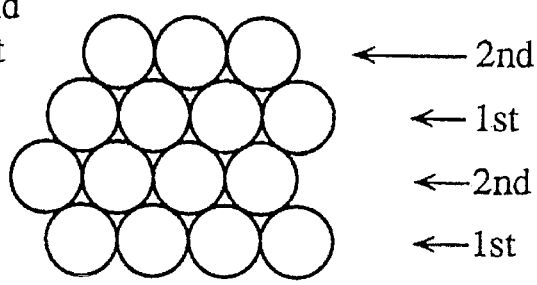
Fig. 13C
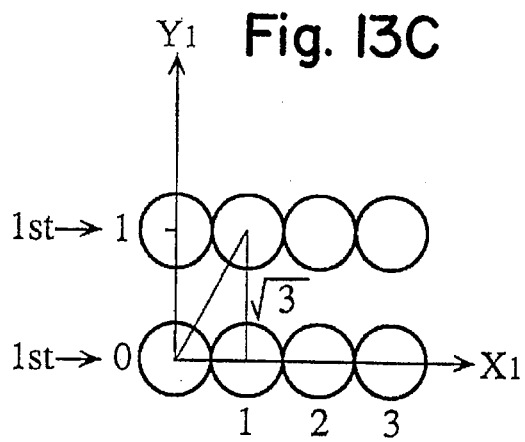
Fig. 13D
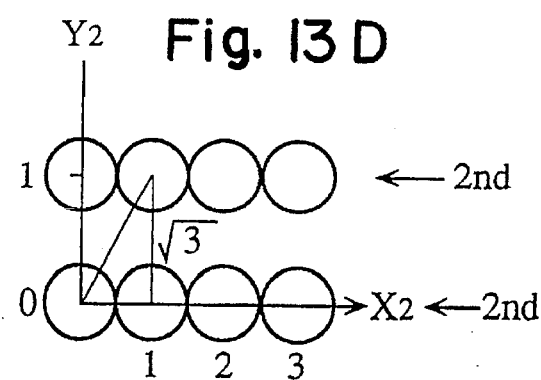
Fig. 13E
$$Ye_1 = \left(\frac{Ye}{\sqrt{3}}\right)$$
$$Xe_1 = Xe$$
Fig. 13F
$$Ye_2 = \left(\frac{Ye}{\sqrt{3}}\right)$$
$$Xe_2 = Xe$$

APPARATUS FOR AND METHOD OF GENERATING A STRAIGHT LINE AND SELECTING LATTICE POINTS FOR DISPLAY

BACKGROUND OF THE INVENTION (1) Field of the Invention

The present invention relates to a graphics display, particularly to a straight line coordinate generator for drawing a line by specifying lattice points (X and Y integer coordinates) which are placed on the line or near the line, and emitting or printing the lattice points.

(2) Description of the Related Art

According to a CAD (Computer-Aided Design) system or a video game, a line which is displayed on a CRT (Cathode Ray Tube) or printed with a printing machine according to its start and end points often fails to be straight because of undesirable placement or size of holes on a shadowmask, or placement of display dots on a crystal dot matrix or on a printing face. More specifically, according to the structural characteristics of a CRT or the printing machine, the placement or the size of the display dots are determined beforehand; therefore, if a line passes between the display dots, it fails to be straight. To overcome such inconveniences, instead of designating the start point and end point, lattice points on a line or lattice points which are placed near the line are emitted or printed. Otherwise, data representing these lattice points are stored in a memory and are outputted later. (The direct emitting/printing of a line and the indirect emitting/printing via a memory on an external device are referred to as "drawing." Emission of a line on the CRT and printing of a line with the printing device are referred to as "display." A device which implements the above drawing or the display often uses a Bresenham algorithm.

The basic Bresenham algorithm is described hereunder.

```
{Note: e is real; x, y, delta x, delta y are integers}
    e: = (delta y/delta x) − 0.5;
    for i: = 1 to delta x do begin
        Plot (x, y);
        if e > 0 then begin
            y: = y+1;
            e: = e−1
            end;
        x: =x+1;
        e: =e+(delta y/delta x);
        end;
Or
{Note: all variables are integers}
    e: =2.delta y-delta x:
    for i: = 1 to delta x do begin
        Plot (x, y);
        if e > 0 then begin
            y: = y+1;
            e: = e+ (2.delta y−2.delta x)
            end
            else e: =e+2.delta y:
        x: =x+1:
        end;
```

("Computer Graphics" (1984) by J. D. Foley et al., translated by Atsumi Imamiya, published by Japan Computer Association, pp. 443–446).

In the Bresenham algorithm, no division operation is used to determine a lattice point to be displayed. Moreover, all the operations are performed on integer data, so that they can be realized with a simple construction of hardware with a low cost. Actually, a straight line coordinate generator according to the above algorithm is integrally constructed as an LSI (Large Scale Integration) circuit, and is commercially available.

The Bresenham straight line drawing algorithm will be described in detail hereunder. Given start coordinates $(X_s, Y_s)$ and end coordinates $(X_e, Y_e)$ of a line on a two-dimensional X-Y surface, coordinates of an nth lattice point, $(X_n, Y_n)$ will be determined (strictly speaking, a line starting with the start point and ending with the end point should be referred to as a "segment" even though it is referred to as a "line" herein). The nth lattice point is to be displayed at the nth display order.

According to a raster-type CRT or printing device, the X and the Y axes represent a main scanning direction and a subscanning direction, respectively, while the lattice points represent luminescent points or pixels. XY coordinates of the start point and the end point may or may not represent lattice points, depending on whether the start point and end point coincide with lattice points. If the start coordinates and the end coordinates do not represent lattice points, a correction is necessary prior to application of the algorithm. This correction will not be described herein since it does not fall within the scope of the present invention.

A right half of the X axis and an upper half of the Y axis each represents a forward direction, and a luminance point represented by smaller XY coordinates will be displayed prior to a luminance point represented by larger XY coordinates.

Constant values $\Delta X$ and $\Delta Y$ are obtained from $\Delta X=X_e-X_s$, $\Delta Y=Y_e-Y_s$ (the same $\Delta X$ and $\Delta Y$ in the above algorithm). When the constant value $\Delta X$ is larger than the constant value $\Delta Y$ ($|\Delta X|>|\Delta Y|$) (condition A), a change in the X coordinates is larger than a change in the Y coordinates of a line to be drawn. Accordingly, the X coordinate is referred to as a reference coordinate, while the Y coordinate is referred to as a judge coordinate. If the contrary to condition A is true, in other words, the constant value $\Delta Y$ is larger than the constant value $\Delta X$, the X coordinate is referred to as the judge coordinate, while the Y coordinate is referred to as the reference coordinate. Further, if the constant value $\Delta X$ is larger than the constant value $\Delta Y$ as well as both $\Delta X$ and $\Delta Y$ are larger than 0 ($\Delta X>0$: condition B) ($\Delta Y>0$: condition C), the X coordinate of the display points will be increased one by one, and upon each increase of the X coordinate, the Y coordinate will be increased by one or zero. As a result, a nearly desired straight line can be drawn. Thus, $X_{n+1}=X_n+1$ ($X_s=1$ and n=1,2, . . . ,e−s+1) is proved in x coordinates. It is assumed that for $X=X_n$, a difference in Y coordinate between the actually displayed lattice point and the desired lattice point is $e_n$ (hereunder referred to as the error $e_n$). Moreover, it is assumed that Y for $X_{n+1}$ is also $Y_n$, that is, $Y_{n+1}=Y_n$. In this case, if the error $e_n$ is positive so that the actually displayed lattice point is below the desired line, an error $e_{n+1}$ for $X=X_{n+1}$ is obtained from $e_n$ in the following:

$$e_{n+1}=e_n+\Delta Y/\Delta X \qquad \text{(Formula A)}.$$

If the error $e_{n+1}$ for $X=X_{n+1}$ is 0.5 or larger ($e_{n+1} \geq 20.5$), the error in Y coordinate will be 0.5 or larger. This indicates that the difference between the actually displayed Y coordinate and the desired Y coordinate is 0.5 or larger. Therefore, the actual Y coordinate $Y_{n+1}$ is closer to $Y_{n+1}$ than to $Y_n$. When the actual Y coordinate is $Y_{n+1}$, the difference will be increased by one. Referring to the above formula A, $e_{n+1}$ can be obtained from $e_n+\Delta Y/\Delta X-1$. If the error $e_{n+1}$ for $X=X_{n+1}$ is smaller than 0.5 ($e_{n+1}<0.5$), on the other hand, the actually displayed Y coordinate $Y_{n+1}$ is closer to $Y_n$ than to $Y_{n+1}$.

As noted above, the error $e_{n+1}$ can be obtained by referring to the error $e_n$ in formula A: If $e_{n+1}>0.5$, $Y_{n+1}=Y_n+1$ and $e_{n+1}=e_{n+1}-1$ . . . (Formula B) . Also, if $e_{+1}<0.5$, $Y_{n+1}=Y_n$ . . . (Formula C), the program operating Formula B is:

If $e_{n+1} \geq 0.5$ then $Y_{n+1}=Y_{n+1}$ and $e_{n+1}=e_{n+1}-1$

The program operating Formula C is:

If $e_{n+1}<0.5$ then $Y_{n+1}=Y_n$

Operating the above Formulae B and C, the Y coordinate $Y_{n+1}$ and the error $e_{n+1}$ will be determined successively. The above formulae B and C indicate that when $e_{n+1}-0.5$ [or $2(e_{n+1}-0.5)\Delta X$] is positive, the Y coordinate of the (n+1)th lattice point is obtained by increasing the Y coordinate of the nth lattice point by one. When $e_{n+1}-0.5$ [or $2(e_{n+1}-0.5)\Delta X$] is negative, on the other hand, the Y coordinate of the nth lattice point also represents the Y coordinate of the (n+1)th lattice point.

In order to include only integer operations, as well as to simplify a computation circuit so that its execution speed will be increased, the above Bresenham straight line drawing algorithm is modified hereinafter, wherein $e_{+1}$ is substituted with an error variable $E_{n+1}$.

It is assumed that $E_{n+1}=2(e_{n+1}-0.5)\Delta X$. Referring to the above formula A, $E_{n+1}=E_n+2\Delta Y$ (provided that $E_0=-\Delta X$) . . . (Formula D). Further, if $E_{n+1} \geq 0$, $Y_{n+1}=Y_n+1$ from the above formula B. Also, $E_{n+1}$ is replaced by $E_{n+1}=E_{n+1}-2\Delta X$ . . . (Formula E). On the other hand, if $E_{n+1}<0$, $Y_{n+1}=Y_n$ from formula C.

$Y_{n+1}=Y_n$ will be obtained when the conditions A, B, and C are satisfied. Eight formulae in total will be generated, depending on if $\Delta X$ or $\Delta Y$ is positive or negative, and also if $\Delta X$ is larger than $\Delta Y$ or vice versa. For example, even when $|\Delta X|$ is larger than $|\Delta Y|(|\Delta X|>|\Delta Y|)$ and $\Delta X$ is larger than 0 ($\Delta X>0$), the Y coordinate will be decreased by one upon each display if $\Delta Y$ is smaller than 0 ($\Delta Y<0$). If $|\Delta Y|>|\Delta X|$, on the other hand, the Y coordinate will be the reference coordinate, so that the Y coordinate will be increased or decreased by one at each display. Subsequently, it is determined whether the X coordinate will be increased by one, zero, or decreased. As a result, it is determined which lattice point, either a lattice point placed at the right or the left of the desired line, will be displayed.

Thus, given the start and end coordinates, the appropriate condition is determined. Subsequently, the formula which corresponds with the condition is selected. From the selected formula, the lattice points to be actually displayed will be determined one by one.

A conventional straight line coordinate generator which performs the above Bresenham straight line drawing algorithm will be described. Referring to FIG. 1, the straight line coordinate generator comprises an end point input unit 10, a start point input unit 11, a display coordinate holding unit 12, an increase constant holding unit 13, an error variable holding unit 14, a first addition constant holding unit 15, a second addition constant holding unit 16, a line gradient constant holding unit 17, an initialization unit 18, a termination control unit 19, a drawing unit 20, a coordinate variable control unit 21, and an error variable control unit 22.

The start and end coordinates are $(X_s, Y_s)$ and $(X_e, Y_e)$, respectively, and $\Delta X(=X_e-X_s)$ and $\Delta Y(=Y_e-Y_s)$ are larger than 0 ($\Delta X>0$, $\Delta Y>0$), as well as $\Delta X$ is larger than $\Delta Y$ ($\Delta X>\Delta Y$).

The end coordinates are provided to the end point input unit 10. Since $|\Delta X|$ is larger than $|\Delta Y|$ of the end coordinates ($|\Delta X|>|\Delta Y|$), the end point input unit 10 informs the termination control unit 19 of only the given X coordinate ($X_e$), as well as informs the initialization unit 18 of both the given X and Y coordinates ($X_e, Y_e$). The start coordinates are provided to the start point input unit 11. Subsequently, the start point input unit 11 informs the display coordinate holding unit 12 and the initialization unit 18 of the start coordinates. The display coordinate holding unit 12 holds XY coordinates of a lattice point to be displayed, (X, Y). The increase constant holding unit 13 holds information indicating which coordinate, either the X or Y coordinate, should be increased by one to forward the display. More specifically, when increasing the X coordinate, the information is represented by XI. When increasing the Y coordinate, the information is represented by YI. For example, when $\Delta X>0$, the value of the XI is 1. Likewise, when $\Delta Y>0$, the value of the YI is 1. The value 1 for the XI and the YI indicate that lattice points will be displayed in a positive direction in which the X coordinate and the Y coordinate increase, respectively. The error variable holding unit 14 holds a value of the error variable E. The first addition constant holding unit 15 has a register, and stores a value of a first addition constant C ($=2\Delta Y$) into the register. The first addition constant C appears in the above formula D, and it is added to the error variable E. Similarly, the second addition constant holding unit 16 stores a second addition constant D ($=2\Delta Y-2\Delta X$) into a register. The second addition constant D is added to the error variable E; thereby both the above formulae C and D are operated concurrently. The line gradient constant holding unit 17 holds a line gradient constant XY indicating which of the constants $\Delta X$ and $\Delta Y$ is greater than the other. It is assumed herein that the constant $\Delta X$ is greater than the constant $\Delta Y$ ($|\Delta X|>|\Delta Y|$), so that the line gradient constant XY is 0. The initialization unit 18 comprises an adder and a subtracter, and computes initial values of each constant and variable by applying the start coordinates ($X_s, Y_s$) and the end coordinates ($X_e, Y_e$) to the Bresenham straight line drawing algorithm. The termination control unit 19 holds the X coordinate of the end point, $X_e$, inputted by the end point input unit 10 as a reference value L, and compares the X coordinate held by the display point coordinate holding unit 12 with the reference value L to judge if the drawing operation is to be terminated.

The drawing unit 20 is a drawing processor for displaying the lattice points represented by the coordinates (X, Y) in the display coordinate holding unit 12 by brightening them. When a C signal is inputted to indicate that the error variable E is negative, the coordinate variable control unit 21 provides the increase constant holding unit 13 with (1,0), which represents the increase constant (XI, YI). Otherwise, the coordinate variable control unit 21 provides the increase constant holding unit 13 with (1, 1); and operates X=X+XI and Y=Y+YI so that the coordinates (X,Y) in the display coordinate holding unit 12 are increased by the increase constant (XI, YI) at each display. The error variable control unit 22 sends the C signals to the coordinate variable control unit 21 when the error variable E held by the error variable holding unit 14 is negative. Concurrently, the error variable control unit 21 reads a first addition constant C from the first addition constant holding unit 15, adds the first addition constant C to the error variable E held by the error variable holding unit 14, and stores the addition result into the error variable holding unit 14. If the error variable E is positive or 0, the error variable control unit 22 reads a second addition constant D from the second addition constant holding unit 16, adds the second addition constant D to the error variable E, and stores the addition result into the error variable holding unit 14.

A register where a value is stored, a comparator for comparing two numeric values, a clock signal generation unit and the like are required to operate the above components appropriately. Accordingly, each of the above components comprises the register and the comparator. An external system clock provides the necessary clock signal to each component. Operation of the register and the comparator, as well as controlling of each unit by the clock signal, are well known, so that illustration and description thereof will be omitted herein.

FIG. 2 describes the operation of the straight line coordinate generator in FIG. 1.

The XY coordinates of a start point, $(X_s, Y_s)$ and the XY coordinates of an end point, $(X_e, Y_e)$ are inputted to the start point input unit 11 and the end point input unit 10, respectively (S1). Subsequently, the end point input unit 10 informs the termination control unit 19 of the X coordinate of the end point, $X_e$ as a termination reference value L; and the termination control unit 19 holds it until the end of the drawing operation (S2). The start point input unit informs the display coordinate holding unit 12 of the XY coordinates of the start point $(X_s, Y_s)$; and the display coordinate holding unit 12 holds them as variables. The drawing unit 20 displays a lattice point represented by the start coordinates $(X_s, Y_s)$, which are held by the display coordinate holding unit 12 (S3). Concurrently, the end point input unit 10 and the start point input unit 11 inform the initialization unit 18 of the end coordinates and the start coordinates. The initialization unit 18 computes each constant and variable in the Bresenham straight line drawing algorithm, and outputs them to the increase constant holding unit 13, the first addition constant holding unit 15, the second addition constant holding unit 16, and the line gradient constant holding unit 17. They hold the given constant and variable until the end of the drawing operation. The error variable holding unit 14 holds the error variable (S4, S5). The error variable to be held by the error variable holding unit 14 first is 2ΔY–ΔX. This is also referred to as $E_2$ or $E_1+2\Delta Y$. The error variable control unit 22 judges if the error variable E is positive or negative, and informs the coordinate variable control unit 21 of the C signal when the error variable is negative. Accordingly, the first addition constant C is added to the error variable E (S12). When the error variable is not negative, on the other hand, the second addition constant D is added to the error variable E (S7). Given the C signal, the coordinate variable control unit 21 increases only the X coordinate in the display coordinate holding unit 12 by one (S9). If no C signal is provided, the coordinate variable control unit 21 increases the Y coordinate in the display coordinate holding unit 12 by one (S8), then increases the X coordinate by one (S9). Upon each increase of the X coordinate, the drawing unit 20 displays the lattice point which is represented by the XY coordinates (X, Y) in the display coordinate holding unit 12 regardless of whether the C signal is provided or not (S10). It is then determined whether the X coordinate in the display coordinate holding unit 12 has reached the value L (S11). If not, the above operations will be repeated from S6 until X is equal to or greater than L.

FIG. 3 shows a desired line which starts with the start point (0,0) and ends with the end point (8,4), as well as lattice points to be displayed. In the figure, the desired line is line 39, the lattice points are 30–38, and the start point is 30.

In the straight line coordinate generator, the error variable E in the error variable holding unit indicates whether the desired line passes at a midpoint between two lattice points which are placed along a judge coordinate axis (the judge coordinate axis herein represents an axis of the judge coordinate). In other words, a distance between the desired line and the midpoint is 0 when the desired line passes at the midpoint. In the above example, the X coordinate, which is the reference coordinate, is an integer, and the Y coordinate, which is the judge coordinate, is the integer+0.5. The error variable control unit 22 determines which lattice point, either above or below the desired line, will be displayed (S6). More specifically, depending on if the error variable E is positive or negative, a value of the increase constant (XI,YI) is either (1,1) or (1,0). Accordingly, the lattice point to be displayed will be determined.

If |ΔY| is larger than |ΔX|, in other words, if the Y coordinate is the reference coordinate, a lattice point either at the left or the right of the desired line will be displayed. According to an actually developed raster-type display device/system or printing device/system, such as a CRT, a video game, a CAD system, and a printing device, the above-identified straight line coordinate generator is employed hereinafter.

(1) A line will be hardly recognizable to human eyes if only lattice points of the line are brightened or printed. Therefore, a lattice point placed above, below, left, or right of the line is also displayed.

(2) Displayed lattice points are colored so that the line can be distinguished.

(3) Instead of inputting XY coordinates which represent a start and an end point, the start and the end points are inputted so that a line connecting them is designated. Also, when three points are inputted, a triangle is drawn by connecting them.

(4) An area is designated by coloring a right side of a designated line; otherwise by filling it with slash lines.

(5) A succeeding program at a system such as a video game and a CAD system uses a designated line.

To fulfill the above operations, additional hardware and software such as a CPU, a memory, a VRAM (Video RAM), or a look up table will be constructed.

Thus, when the desired line passes at the midpoint between two lattice points along with the judge coordinate axis, the above straight line coordinate generator designates which lattice point is to be displayed. However, an operational problem occurs when the straight line coordinate generator and the software running on the same hardware system designate to display different lattice points. Since the straight line coordinate generator is a large-scale integrated circuit (LSI), the software cannot be replaced with other software to solve the problem. Thus, not every system can run the above straight line coordinate generator, which reduces its compatibility.

For example, in a video game system or a CAD system, one side of a line, such as the right side, is colored with red or the like after the line is specified. If the line passes at the midpoint between two lattice points, a program for displaying the specified line and a program for coloring the right side will not correspond well to each other. As a result, an error message will be displayed and a succeeding program cannot be operated. Otherwise, there will be a part left uncolored on the right side of the specified line.

SUMMARY OF THE INVENTION

Accordingly, it is an object of the present invention to provide a straight line coordinate generator which specifies a line according to a Bresenham straight line drawing algorithm and improves the compatibility of a conventional straight line coordinate generator.

The above object may be fulfilled by a straight line coordinate generator for displaying a lattice point of a line according to a Bresenham line drawing algorithm when XY coordinates of a start point and an end point of the line are given, the straight line coordinate generator comprising a reference coordinate determination unit for detecting a difference in absolute value between the X coordinate of the start point and the X coordinate of the end point, and a difference in absolute value between the Y coordinate of the start point and the Y coordinate of the end point, then making the coordinate with a bigger difference in the absolute value into a reference coordinate and the other coordinate into a judge coordinate, a designate constant input unit for inputting a designate constant indicating which of two lattice points is displayed when the reference coordinate is an integer and the judge coordinate is a sum of the integer and ½, the lattice points being placed in a direction of a judge coordinate axis and being equally distant from the line, a designate constant holding unit for holding the designate constant which is inputted by the designate constant input unit, a constant computation unit for applying the XY coordinates of the start point and the end point to the Bresenham line drawing algorithm to compute each constant of the Bresenham line drawing algorithm, a variable computation unit for, when the reference coordinate of a point is an integer, computing an error variable which corresponds to a distance between the point and a lattice point placed near the point by obtaining the error variable of a lattice point to be displayed first according to the designated constant which is held by the designate constant holding unit, and obtaining the error variable of a lattice point to be displayed second or later according to the designate constant which is held by the designate constant holding unit and the error variable of a preceding lattice point, a variable holding unit for holding the error variable which is computed by the variable computation unit, and a lattice point display unit for displaying a lattice point which is designated by the designate constant when the error variable which is held by the error variable holding unit indicates that the line passes at a midpoint of said two lattice points.

The designate constant input unit may input two sorts of designate constants selectively, each of which designates to display one of said two lattice points.

The straight line coordinate generator may further comprise a designate constant registration unit where the designate constant is registered according to each of eight combinations, said eight combinations being determined based upon whether the reference coordinate is an X coordinate or a Y coordinate, as well as whether a relative X coordinate and a relative Y coordinate is positive or negative when the start point is an original point, wherein the designate constant input unit detects from the designate constant registration unit the designate constant for the XY coordinates of the start point and the end point, and inputs the detected designate constant.

The designate constant input unit may be comprised of a designate constant replacement unit for, whenever the judge coordinate becomes the integer+½, replacing the designate constant which is held by the designate constant holding unit with another designate constant which represents the display of the other lattice point.

The designate constant input unit, when the reference coordinate is an integer and the judge coordinate is a sum of the integer and ½, may detect which of the two lattice points a device displays, the device being connected to the straight line coordinator generator, and inputs the designate constant which directs to display the same lattice point as the device.

The designate constant input unit may be comprised of a designate constant replacement unit for, whenever the judge coordinate becomes the integer+½, replacing the designate constant which is held by the designate constant holding unit with another designate constant which represents the display of the other lattice point.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 3 is an example of a line which is specified by the conventional straight line coordinate generator in FIG. 1;

FIG. 4 (B) shows a detailed construction of the coordinate processor 1 of FIG. 4 (A);

FIG. 4 (C) shows a setting of the designate constant in the register 133;

FIGS. 13 (A)–13 (F) show a specification of a line in a further embodiment of the present invention, wherein FIG. 13 (A) shows interlaced scanning for the CRT of a TV;

FIG. 13 (B) shows a shadowmask using a TV CRT;

FIG. 13 (C) shows the lattice points corresponding to a scan of a first line;

FIG. 13 (D) shows the lattice points corresponding to a scan of a second line;

FIG. 13 (E) shows a correction of the end point of the lattice points shown in FIG. 13 (C) when the present straight line coordinate generator is used; and FIG. 13 (F) shows the correction of the end point of the lattice points shown in FIG. 13 (C) when the present straight line coordinate generator is used.

DESCRIPTION OF THE PREFERRED EMBODIMENTS (Embodiment 1)

A first embodiment of the present invention will be described hereunder as referring to FIGS. 4 through 9.

Figure 4A:
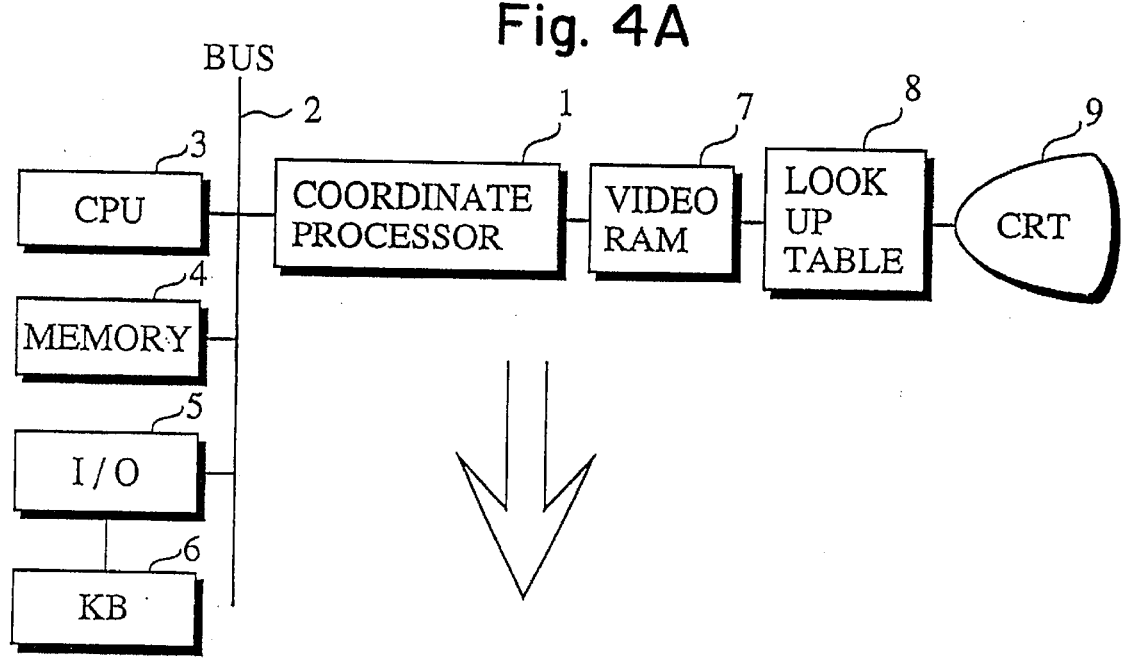
FIG. 4 (A) shows a construction of a system which includes a straight line coordinate generator of the present invention.
Figure 4B:
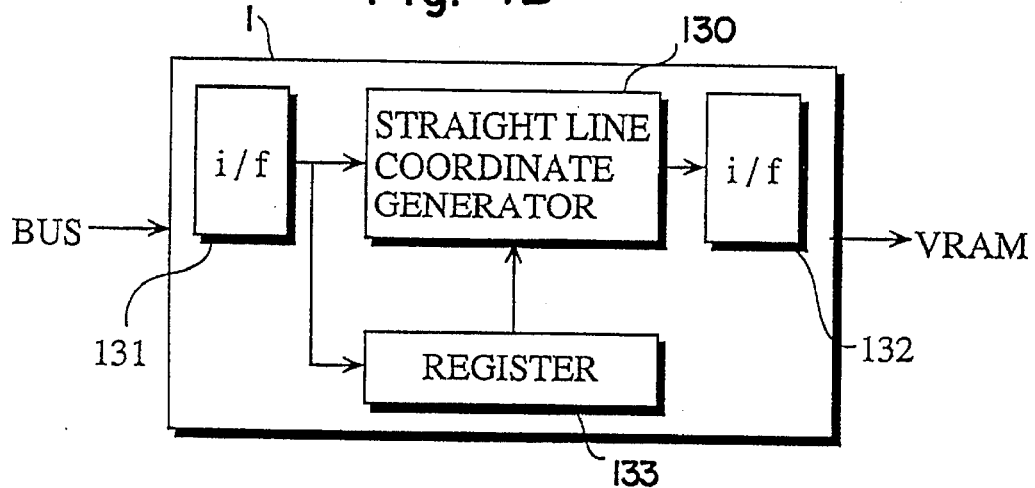
Figure 4C:
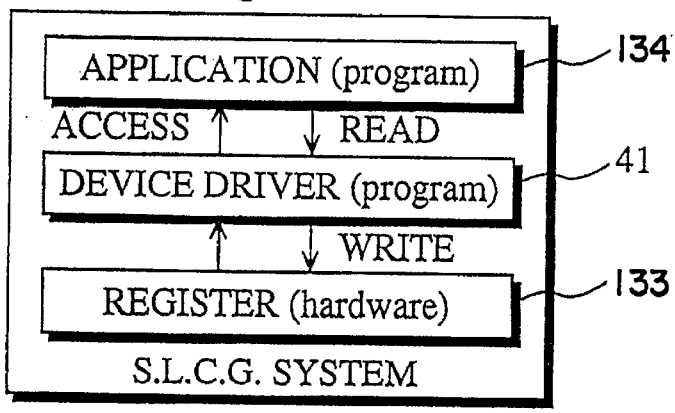

FIG. 4 (A) shows construction of a system which includes a straight line coordinate generator. In FIG. 4 (A), a coordinate processor 1 is connected to a CPU 3 (Central Processing Unit), a memory 4, an I/O (Input/Output) 5, and a KB (Keyboard) 6 via a bus 2. A lattice point which specifies a line is emitted and displayed on a CRT (Cathode Ray Tube) 9 via a video RAM (Random Access Memory) 7, and a look up table 8. The system in FIG. 4 (A) is substantially the same as the conventional system; also each component, such as the CRT 9, is substantially the same as conventional hardware except the coordinate processor 1.

FIG. 4 (B) shows detailed construction of the coordinate processor 1 in FIG. 4 (A). In FIG. 4 (B), a straight line coordinate generator 130 is connected to the bus 2 via an i/f (interface) 131 for input. At the same time the straight line coordinate generator 130 is connected to a video RAM 7 via an i/f (interface) 132 for output. The straight line coordinate generator 130 is distinguished from the conventional hardware in that a register 133 is connected to a branch line divided from the i/f 132, and an output from the register 133 is provided to the straight line coordinate generator 130. A designate constant and the like which are applied to the straight line drawing program is stored in the register 133. Accordingly, upon the start of a line drawing operation, the straight line coordinate generator 130 reads the designate constant and the like from the register 133.

FIG. 4 (C) shows a setting of the designate constant at the register 133. When the CAD system which includes the straight line coordinate generator 130 starts to operate, a device driver 41 which has been stored in the memory 4 as a program reads an application program from the CPU 3. The device driver 41 further detects what the application program directs when a desired line passes at a midpoint of two lattice points which are placed along a judge coordinate axis (a judge coordinate axis represents an axis of the judge coordinate). From the application program, the device driver 41 detects a designate constant and the like, and writes it into the register 133. Thus, the initial setting of the designate constant is completed.

Figure 5:
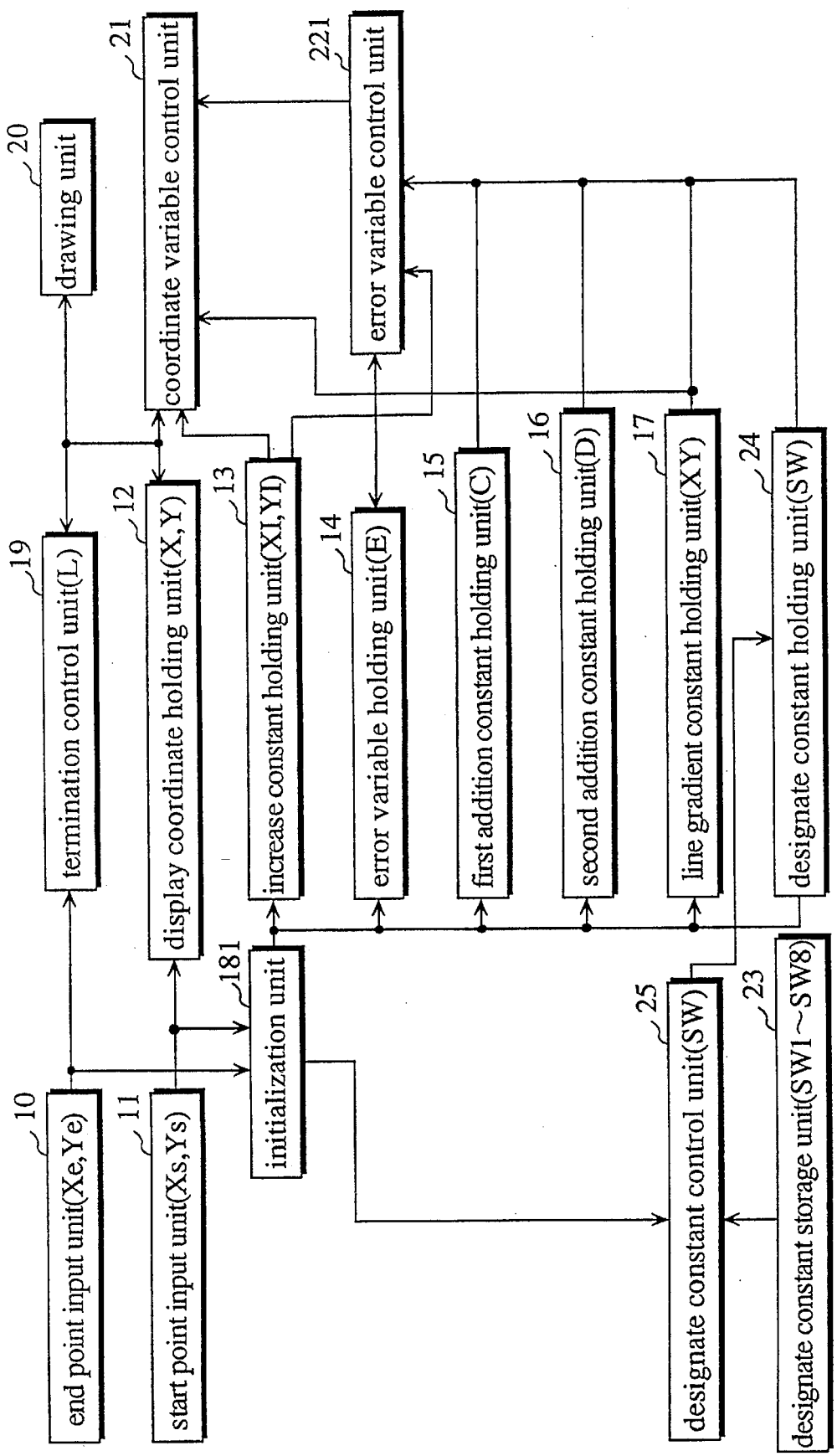
FIG. 5 is a block diagram depicting a straight line coordinate generator in an embodiment of the present invention.

FIG. 5 is a block diagram depicting the straight line coordinate generator 130. In the figure, the straight line coordinate generator 130 comprises an end point input unit 10, a start point input unit 11, a display coordinate holding unit 12, an increase constant holding unit 13, an error variable holding unit 14, a first addition constant holding unit 15, a second addition constant holding unit 16, a line gradient constant holding unit 17, an initialization unit 181, a termination control unit 19, a drawing unit 20, a coordinate variable control unit 21, an error variable control unit 221, a designate constant storage unit 23, a designate constant holding unit 24, and a designate constant control unit 25.

Figure 1:
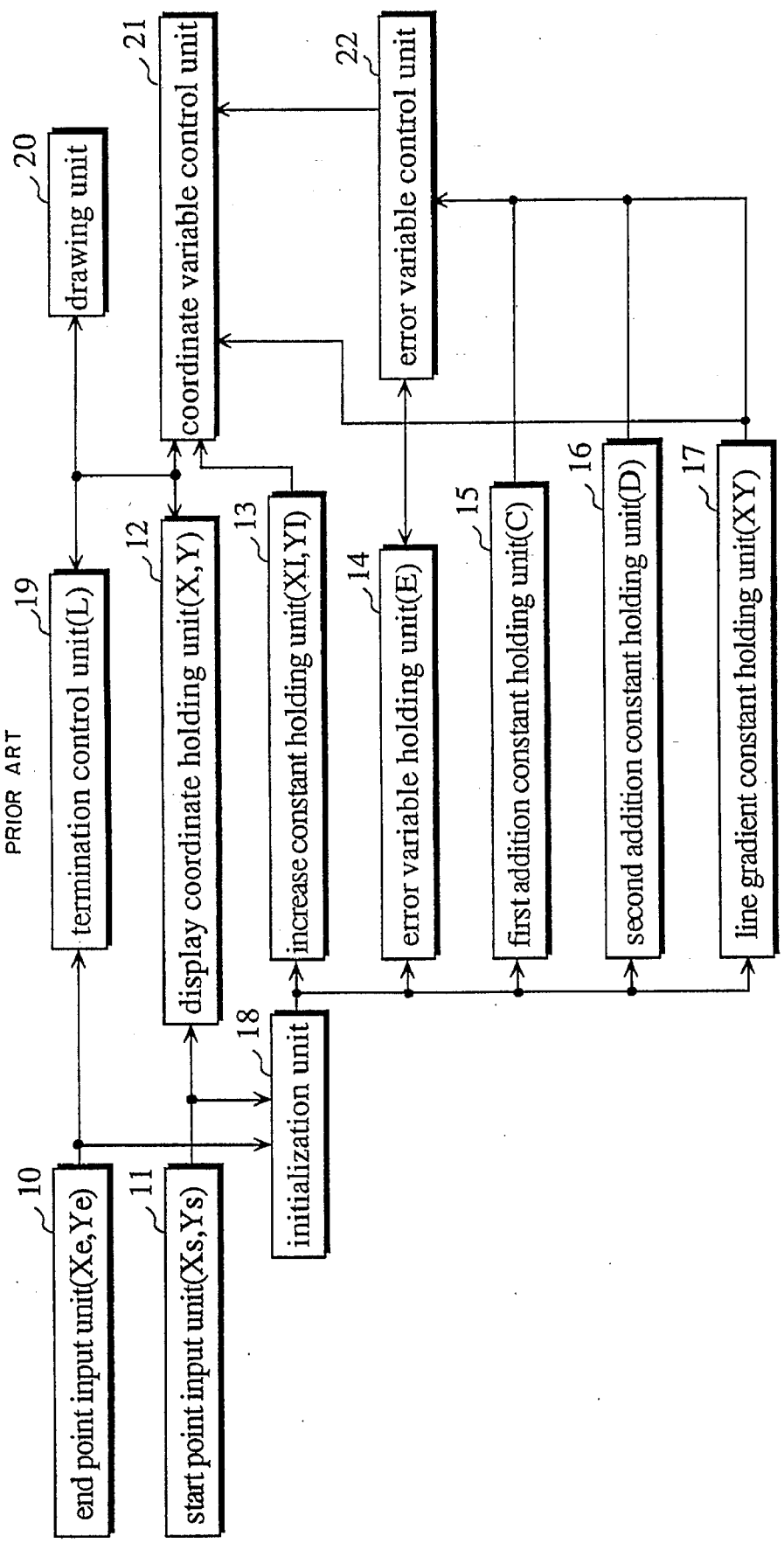
FIG. 1 shows a construction of a conventional straight line coordinate generator.
Figure 2:
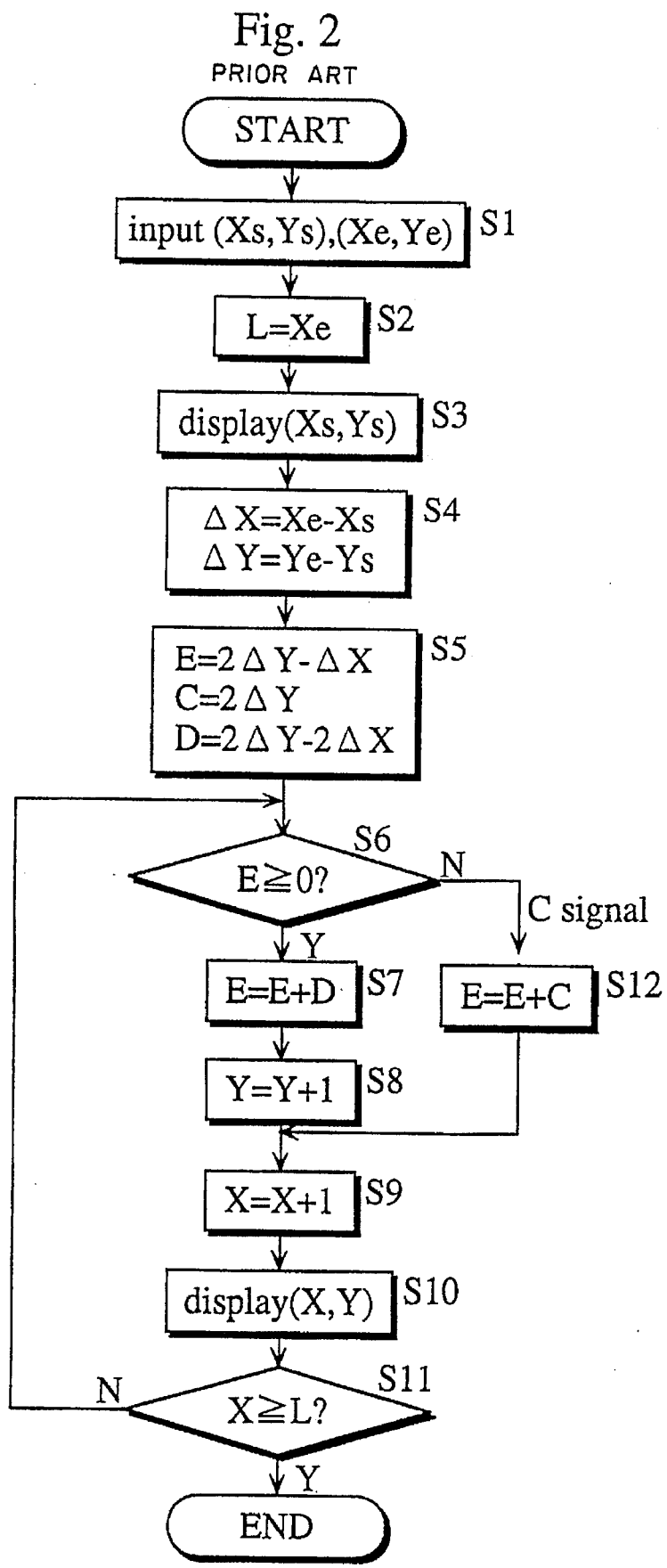
FIG. 2 is a flow chart showing the operation of the conventional straight line coordinate generator in FIG. 1.

In FIG. 5, like components are labeled with like reference numerals with respect to FIG. 1, and the description of these components is not repeated.

The components which are unique in this embodiment will be described in detail.

When the CAD system starts to operate, the initialization unit 181 reads the program from the CAD system; determines a value of the designate constant; and informs the designate constant holding unit 24 of the value. These units operating the designate constant setting are accommodated inside of the device driver 41 in FIG. 4 (C).

The designate constant holding unit 24 corresponds to the register 133 in FIG. 4 (B). The designate constant holding unit 24 holds a designate constant SW. The designate constant SW represents which lattice point will be displayed when the desired line passes at the midpoint of two lattice points. Accordingly, the designate constant SW varies according to the CAD system which includes the straight line coordinate generator.

The error variable control unit 221 corresponds to the straight line coordinate generator 130 in FIG. 4 (B). The error variable control unit 221 reads an increase constant (XI, YI) and a line gradient constant XY from the increase constant holding unit 13 and the line gradient constant holding unit 17, respectively. Also, according to the program which is applied to the CAD system, the error variable control unit 221 reads a value of the designate constant SW from the designate constant holding unit 24.

When a subtracting result obtained by subtracting the designate constant SW which is held by the designate constant holding unit 24 from the error variable E which is held by the error variable holding unit 14 (E-SW) is negative, the error variable control unit 221 provides a C signal to the coordinate variable control unit 21, and reads a first addition constant C from the first addition constant holding unit 15. When the subtraction result (E-SW) is negative or 0, on the other hand, the error variable control unit 221 reads a second addition constant D from the second addition constant holding unit 16; adds D to the error variable E which is held by the error variable holding unit 14; and stores the addition result into the error variable holding unit 14.

The designate constant storage unit 23 corresponds to the device driver 41 in FIG. 4 (C). The designate constant storage unit 23 holds a table where each designate constant value SW is stored. The designate constant value represents a display direction, and it corresponds to one of eight display directions. According to the display direction, the designate constant control unit 25 reads the designate constant value from the table, and stores it into the designate constant holding unit 24.

Figure 6:
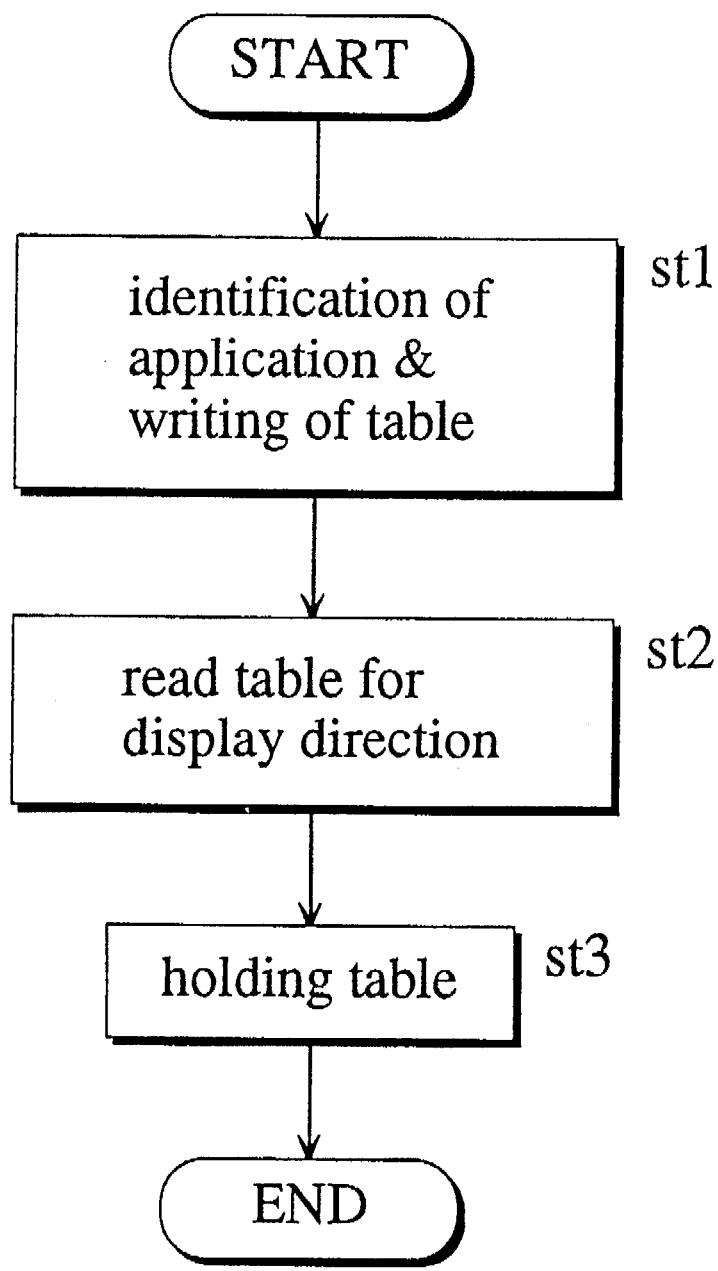
FIG. 6 is a flow chart showing an initial operation of the straight line coordinate generator in FIG. 5.

FIG. 6 is a flow chart showing the initialization operation of the straight line coordinate generator. The user of the straight line coordinate generator or the software detects a display direction to be applied when the desired line passes at the midpoint between two lattice points; and writes a value which corresponds to the detected display direction into the designate constant storage unit 23 (st 1). According to the display direction, the designate constant control unit 25 reads the designate constant from the table (st 2), and stores it into the designate constant holding unit 24 (st 3).

Figures 7A, 7B:
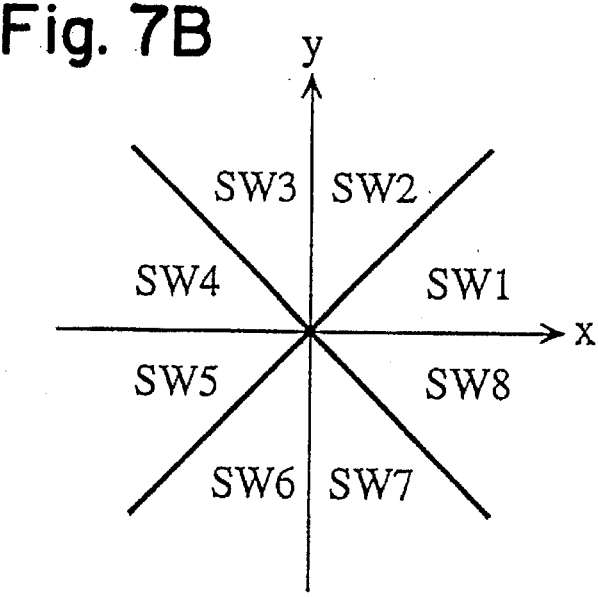
FIGS. 7 (A) and 7 (B) show a setting of a designate constant which is applied to the straight line coordinate generator in FIG. 5, wherein FIG. 7 (A) shows a correspondence between a constant and a sign indicating a line gradient, and FIG. 7 (B) shows an area for the line gradient which is represented by the sign.

FIG. 7 (A) shows an example of the designate constant SW. Four sorts of tables are generated, depending on which lattice point, below, above, right, or left of the desired line, will be displayed in the program running the CAD system and the like. A number of tables may be generated when a variety of programs operate the straight line coordinate generator system, such as a video game system, or when the system responds to a unique request, such as a user input from the keyboard 6, shown in FIG. 4(A). FIG. 7 (A) shows an example of the table which is stored in the designate constant storage unit 23. FIG. 7 (B) shows display directions represented by each end point, in which the start point coincides with an original point of the coordinate system. Display directions SW1 through SW8 at rows 71 through 78, respectively, in FIG. 7 (A) correspond to SW1 through SW8 in FIG. 7 (B), respectively. The SW locations 31 through 38 in FIG. 7 (A) hold a value of the designate constant SW, each corresponding to the display direction SW1 through SW8, respectively. Each of the designate constants is inputted by 8-bit data (e.g., "10001110") in which each bit is assigned to one direction. Here, when the desired line passes between two lattice points (these points having the same value as the reference coordinate, but a value which differs from the judge coordinate by one), each bit shows which of these lattice points is to be displayed. More specifically, in the process of determining which lattice points compose the desired line, when one of the bits is set to 1, then the present device selects the lattice point which has the same coordinate as one of the two previously-determined lattice points. On the other hand, when one of the bits is set to 0, the present device selects one of the two lattice points which is positioned so that its coordinates include a value which is one greater than the value of the judge coordinate of the preceding lattice point. Besides the above, FIG. 7 (A) shows a value of XI, YI, and XY for each display direction. The three values XI, YI, and XY serve as the parameters for specifying one out of the eight generation directions shown in FIG. 7 (B).

Figure 8:
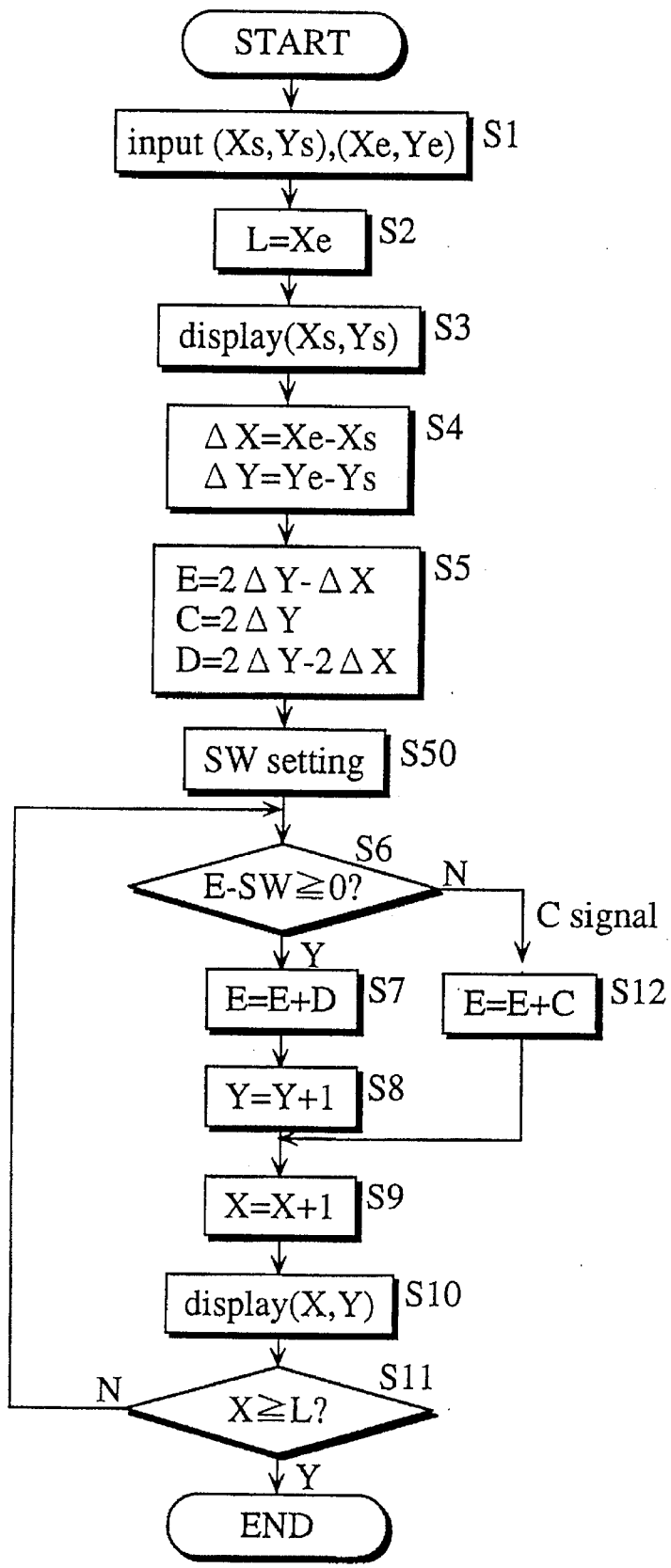
FIG. 8 is a flow chart showing a line generation operation in the, embodiment of the present invention.

FIG. 8 is a flow chart depicting an operation of the straight line coordinate generator.

It is assumed that the original point (0,0) in FIG. 3 represents the start point, and (8,4) represents the end point; and display of a line starting with the above start point and ending with the above end point will be described.

The end coordinates (8,4) and the start coordinates (0,0) are inputted to the end point input unit 10 and the start point input unit 11, respectively (S1). The end point input unit 10 outputs the X coordinate of the end point to the termination control unit 19. Subsequently, the termination control unit 19 holds the given X coordinate as an end reference value L (S2). The start point input unit 11 outputs the start coordinates (0,0) to the display coordinate holding unit 12; and the display coordinate holding unit 12 holds the given start coordinates (0,0) as data which can be replaced by another. The drawing unit 20 displays a lattice point which is represented by the start coordinates (0,0) at the display coordinate holding unit 12 by brightening it (S3). The end point input unit 10 and the start point input unit 11 output the end coordinates (8,4) and start coordinates (0,0) to the initialization unit 181. The initialization unit 181 applies the start and end coordinates to the Bresenham straight line drawing algorithm so that each constant and variable will be obtained. The computation results are: $\Delta X=8$, $\Delta Y=4$, $E_1=0$, $C=8$, $D=-8$, $XY=0$, $XI=1$, $YI=1$ (S4 and S5). The designate constant control unit 25 reads the designate constant which corresponds to the display direction from the designate constant storage unit 23, and stores the designate constant into the designate constant holding unit 24. The error variable control unit 221 is informed of the increase constant (XI, YI) which is held by the increase constant holding unit 13 and the line gradient constant XY which is held by the line gradient constant holding unit 17. To be concrete, the error variable control unit 221 is informed of (XI, YI, XY)=(1, 1, 0) herein. Subsequently, the error variable control unit 221 reads from the designate constant holding unit 24, which contains a table similar to the one shown in FIG. 7 (A), the designate constant SW which corresponds to (XI, YI, XY)=(1, 1, 0). That is, SW=1 is read (S50). The error variable control unit 221 subtracts the error variable $E_n$, which is held by the error variable holding unit 14, from the designate constant SW, which is held by the designate constant holding unit 24 ($E_n$-SW). In the above example, ($E_1$=0) is subtracted from SW(=1). Since the subtraction result is $-1(<0)$ (S6), C(=8) is added to the error variable E(=0), and the newly obtained E (=8) is stored into the error variable holding unit 14 as data which can be replaced by another (S12). The error variable control unit 221 inputs the C signal to the coordinate variable control unit 21. Subsequently, the coordinate variable control unit 21 increases the X coordinate at the display coordinate holding unit 12 by 1 (S9). The drawing unit 20 displays the newly obtained coordinate (1,0) by lighting it (S10).

The drawing will continue since X(=1) is smaller than L(=8) (S6). The error variable control unit 221 subtracts the designate constant SW (=8) at the designate constant holding unit 24 from the error variable E (=1) at the error variable holding unit 14 (E-SW). The subtraction result is 7($\geq 0$) (S6), so that D(=-8) is added to the error variable E (=8). The addition result is stored into the error variable holding unit 14 as a new error variable E(=0) (S7). Since the C signal is not inputted to the coordinate variable holding unit 21, both the X (1) and Y (0) coordinates are increased by one, and the data at the display coordinate holding unit 12 are replaced by the newly obtained coordinate (2,1). The drawing unit 20 displays the lattice point represented by the coordinate (2,1).

Figure 9:
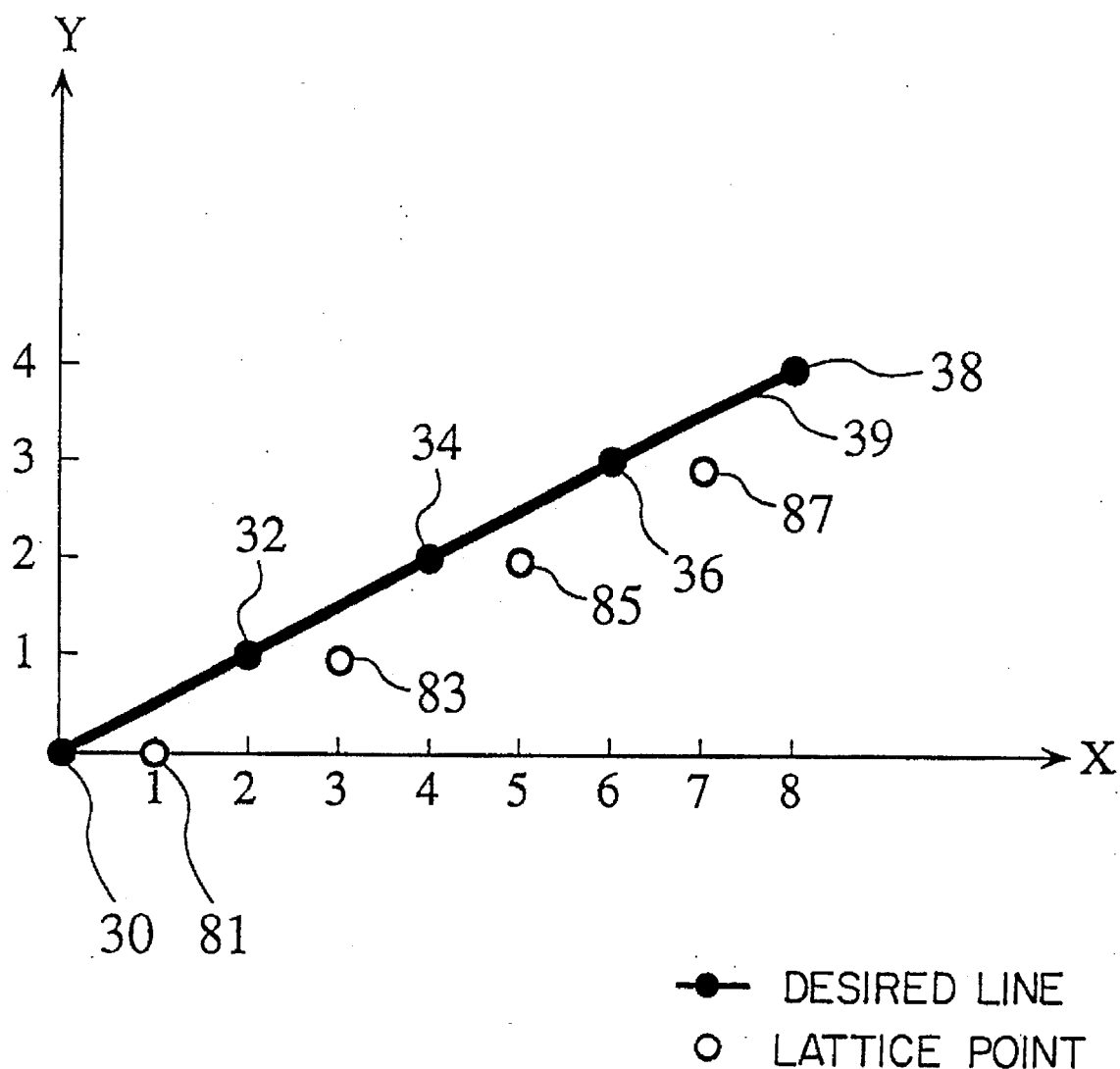
FIG. 9 is an example of a line which is specified by the straight line coordinate generator in FIG. 5.

The above operations are repeated until the X coordinate which is held by the display coordinate holding unit 12 reaches X=8. Once the X coordinate reaches X=8, the termination control unit 19 terminates the operation of each unit. FIG. 9 shows the desired line and the lattice points which have been displayed until the straight line coordinate generator terminates its operation. In the figure, a line 39 represents the desired line and points 30, 32, 34, 36, 38, 81, 83, 85, and 87 represent the lattice points which are actually displayed. Although in FIG. 3 a lattice point which is placed above the desired line is displayed when the desired line passes at the midpoint between two lattice points which are placed along the Y axis (judge coordinate axis), it is designed herein to display a lattice point which is placed below the desired line. While the lattice points 31, 33, 35, and 37 are displayed in FIG. 3, the lattice points 81, 83, 85, and 87 are displayed in FIG. 9. If the value of the designate constant SW1 is 0 instead of 1, on the other hand, a lattice point which is placed above the desired line will be displayed. By functioning as described above, the present device is able to draw a straight line in accordance with an indication (the eight-bit data SW) received from outside the device. The indication may be in any of eight possible directions. Neither the ability to draw a line in accordance with an external indication nor the ability for the external indication to have eight possible directions is possible using conventional drawing techniques.

Although in the above preferred embodiment the identification of the application program and the writing into the table are stored in the memory 4 of FIG. 4 (A), they may be stored in the register, and the register can be integrated with the straight line coordinate generator.

(Embodiment 2)

Besides the above embodiment, an error variable control unit herein has a bit judge unit and a bit reversing unit. Prior to detecting a lattice point to be displayed next, the bit judge unit judges if the error variable E is 0, and outputs a signal confirming E=0. When receiving the signal from the bit judge unit, the bit reverse unit reverses a bit value of a designate constant which is held by a designate constant holding unit from 0 into 1 or 1 into 0. Accordingly, at every occurrence of E=0, in other words, whenever a desired line passes at a midpoint of lattice points which are placed along a judge coordinate direction, a lattice point which is placed at an opposite side of the previously-displayed lattice point will be displayed.

Figure 10:
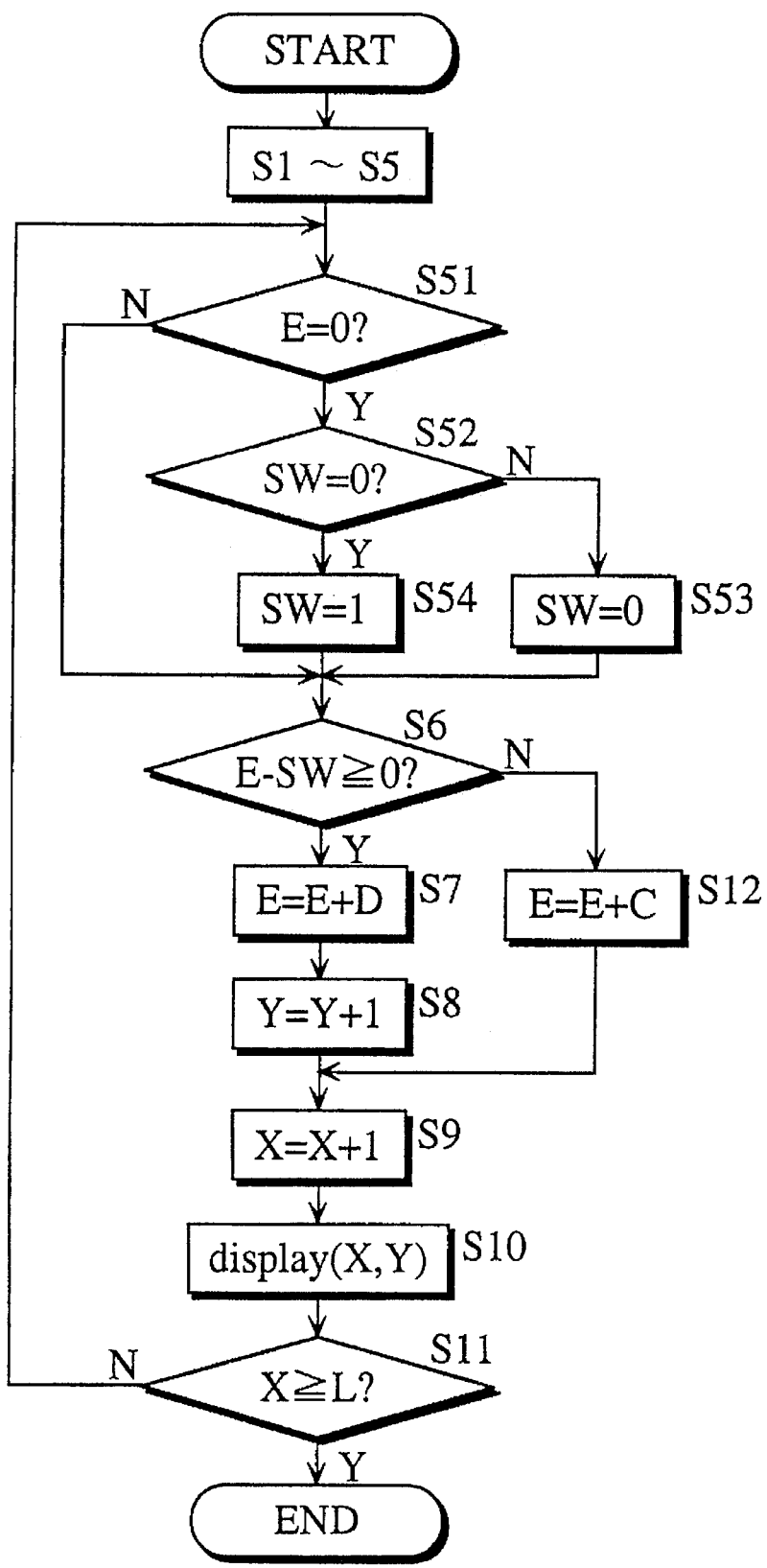
FIG. 10 is a flow chart showing the operation of the straight line coordinate generator in FIG. 5 in another embodiment of the present invention.

FIG. 10 is a flow chart showing the reverse operation of the designate constant value SW upon each detection of E=0, in which like step operations are labeled with like reference numerals with respect to the first embodiment, and the description of the step operations is not repeated.

As long as the display operation continues, it is determined whether E is 0 or not prior to each lattice point display (S51). When E is not 0, the subtraction result E-SW is compared to 0, which is the same as the conventional operation (S6). When E is 0, on the other hand, the error variable control unit 221 detects a value of the designate constant SW (S52). If the designate constant SW is 1, it is converted into 0 (S53). If the designate constant SW is 0, on the other hand, it is converted into 1 (S54). Accordingly, whenever the desired line passes at the midpoint of lattice points, the lattice points which are placed above and below the desired line will be displayed interchangeably.

Figure 11:
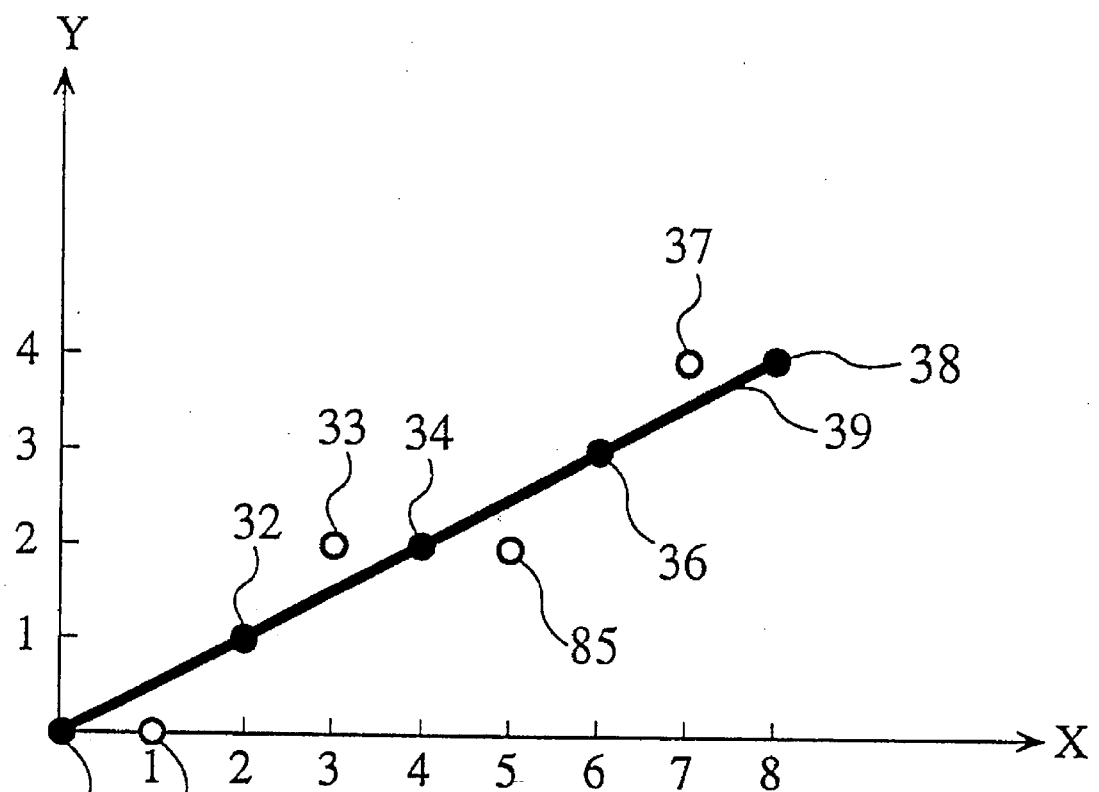
FIG. 11 illustrates an example of a line which is specified in the embodiment in FIG. 10.

FIG. 11 shows lattice points to be actually displayed when a desired line 39 starts with (0,0) and ends with (8,4). In the figure, like points and lines are labeled with like reference numerals with respect to FIGS. 3 and 9.

A line with a display direction other than the above can be displayed by applying a relevant Bresenham straight line drawing algorithm and constants.

(Embodiment 3)

Figure 12:
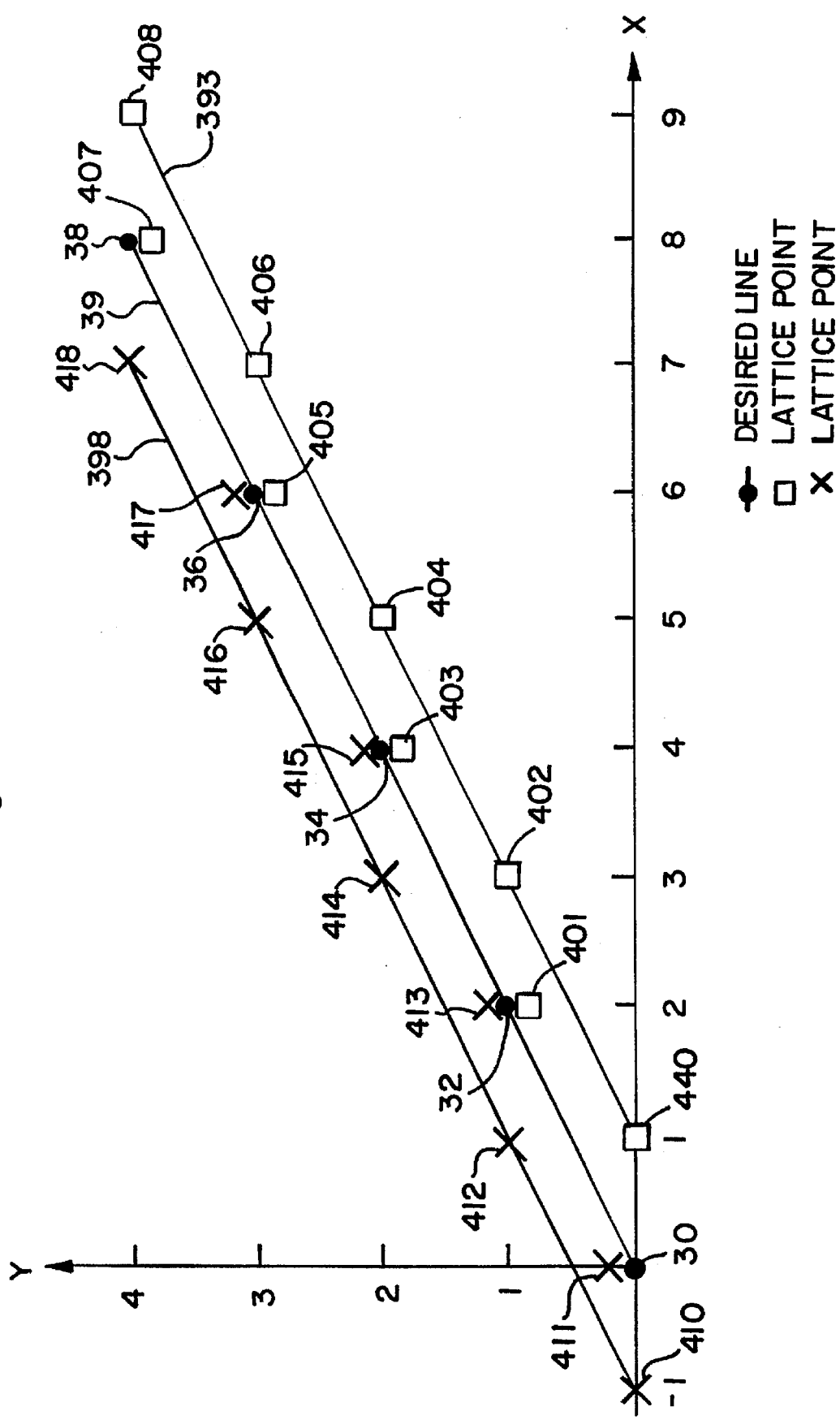
FIG. 12 shows an example of a line which is specified in another embodiment of the present invention.

A plurality of a straight line coordinate generators are used to display a clearly outlined thick line. In the above embodiments, a lattice point which is placed close to a desired line or a lattice point which is placed on the desired line is emitted on a CRT, whereby a nearly desired straight line is generated. However, the line is often too thin to be recognized. Accordingly, another line placed next to the desired line is also displayed. When the line is placed above (left) of the desired line and the line passes at a midpoint of two lattice points along a judge coordinate axis (axis of a judge coordinate), the lattice point which is placed below (right) of the line will be displayed. Therefore, a clearly outlined thick line can be displayed. FIG. 12 shows the lattice points to be displayed. In the figure, a desired line 39 starts with start coordinates (0,0) and ends with end coordinates (8,4). The line 39 corresponds to the line 39 in FIGS. 3 and 9. A line 393 starting with start coordinates (1,0) and ending with end coordinates (9,4) is placed to the right of the line 39. The lattice points 400, 402, 404, 406, and 408 which form the line 393 are shown by squares in the figure. When the line 393 passes at the midpoint of two lattice points, the lattice points 401, 403, 405, and 407 which are placed to the left of the line 393 will be displayed.

Also, a line 398 starting with start coordinates (−1, 0) and ending with end coordinates (7, 4) is placed to the left of line 39. The lattice points 410, 412, 414, 416, and 418 which form the line 398 are shown by crosses in the figure. When the line 398 passes at the midpoint of two lattice points, the lattice points 411, 413, 415, and 417 which are placed to the right of the line 398 will be displayed. It should be noted here that in the present drawing lattice points 30 and 411 have the same coordinates. In the same way, lattice points 32, 401, and 413, lattice points 34, 403, and 415, lattice points 36, 405, and 417, and lattice points 38 and 407 have the same coordinates, respectively.

(Embodiment 4)

As shown in FIG. 13 (A), an interlace scanning technique is applied to a CRT (Cathode Ray Tube) of a television set to improve resolution. Further, as shown in FIG. 13 (B), a pair of shadowmasks are placed horizontally where the centers do not coincide with each other. A pair of straight line coordinate generators operate interchangeably; and a straight line at a first scanning and a straight line at a second scanning are displayed separately from each other. Accordingly, two coordinate systems $(X_1, Y_1)$ and $(X_2, Y_2)$ in FIGS. 13 (C) and 13 (D) are employed. Also at each coordinate system a space between two lattice points in a vertical (Y) direction and a space between two lattice points in a horizontal (X) direction are not equal to each other, but correspond to the ratio $3^{1/2}:1$. Therefore, a correction such as multiplying a Y coordinate of an end point by $3^{1/2}$ is needed. The correction will be shown in FIG. 13 (E) and (F), in which $(X_e, Y_e)$ represents an end point at a coordinate system where the above two spaces are equal to each other.

According to the $(X_1, Y_1)$ coordinate system which places the lower line, a lattice point which is placed above the desired line will be displayed when a desired line passes at a midpoint between two lattice points. According to the $(X_2, Y_2)$ coordinate system which places the upper line, a lattice point which is placed below the desired line will be displayed when a desired line passes at the midpoint. As described above, the device of the present embodiment can draw a straight line in the same way as in the first and second embodiments, even when the ratio of the interval between lattice points in the X axis to that in the Y axis is not 1:1.

Since an absolute value of the difference between the centers of the two horizontally piled shadowmasks is small, the displayed lines looks as if they were a single line displayed according to one algorithm.

Besides the above embodiments, the following may be applied to the present invention.

1. A color display on the CRT may be realized by enabling each straight line coordinate generator to read a color of R, G, B. An adjustment device should operate to make the straight coordinate generators detect when an identical lattice point is indicated.
2. Hardware may be an IC (Integrated Circuit) even when it comprises components which are physically independent from each other. Also, a register can be any of a high-speed semiconductor memory, a memory disk, and the like.
3. Operation of each component may be controlled in accordance with a clock signal which is generated by a clock signal generation device. Otherwise, each component may start its operation by referring to an algorithm which detects the termination of a component which operates beforehand. Also, a combination of the clock signal and the algorithm may be used.
4. In the first embodiment, when the device driver detects which lattice point is displayed on the CAD system, the display of either above or below (left or right) may be set beforehand. Then, if an error signal is received from the CAD system, display of the other lattice point may be set by updating the designate constant.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A straight line coordinate generator device for displaying on a display device a lattice point of a line according to a Bresenham line drawing algorithm when XY coordinates of a start point and an end point of the line are given, the straight line coordinate generator comprising:

a reference coordinate determination means for determining a reference coordinate and a judge coordinate by calculating a difference in absolute value between the X coordinate of the start point and the X coordinate of the end point, and a difference in absolute value between the Y coordinate of the start point and the Y coordinate of the end point, wherein the differences in absolute values are compared to determine which coordinate has a largest difference in absolute value and which coordinate has a smallest difference in absolute value, the coordinate with the largest difference in absolute value being designated a reference coordinate and the coordinate with the smallest difference in absolute value being designated a judge coordinate, if the differences in absolute values are equal, a predetermined coordinate is designated a reference coordinate;

a constant input means for inputting a constant, the constant indicating which one of two lattice points to display when the reference coordinate is an integer and the judge coordinate is a sum of the integer and ½, the two lattice points being located in a direction of a judge coordinate axis and are equally distant from the line, such that the line passes at a midpoint of the two lattice points;

a constant holding means for holding the constant which is inputted by the constant input means;

a value computation means for applying the XY coordinates of the start point and the end point to the Bresenham line drawing algorithm to compute each value of the Bresenham line drawing algorithm;

a variable computation means for computing an error variable when the reference coordinate of a point is an integer, the error variable corresponding to a distance between the point and a lattice point which is placed near to the point by computing an error variable of a lattice point to be displayed first as indicated by the constant held by the constant holding means, and computing the error variable of a lattice point to be displayed next as indicated by the constant held by the constant holding means and the error variable of a preceding lattice point;

a variable holding means for holding the error variable which is computed by the variable computation means; and a lattice point display means for displaying a lattice point which is designated to be displayed by the constant when the error variable which is held by the error variable holding means indicates that the line passes at a midpoint of the two lattice points.

2. The straight line coordinate generator of claim 1, wherein the constant input means selectively inputs one of two different constants, each constant designating to display one of the two lattice points.

3. The straight line coordinate generator of claim 2 further comprising a constant registration means wherein the constant is registered according to each of eight combinations, said eight combinations being determined based upon whether the reference coordinate is the X coordinate or the Y coordinate and whether a relative X coordinate and a relative Y coordinate are positive or negative when the start point is set as a point of origin, wherein the constant input means detects from the constant registration means the constant for the XY coordinates of the start point and the end point, and inputs the detected constant to the constant holding means.

4. The straight line coordinate generator of claim 2, wherein the constant input means comprises a constant replacement means for replacing the constant held by the constant holding means with a second constant which indicates the display of a second lattice point, the constant replacing means replacing the constant held by the constant holding means whenever the judge coordinate equals the sum of the integer plus ½.

5. The straight line coordinate generator of claim 2, wherein the constant input means, when the reference coordinate is an integer and the judge coordinate is a sum of the integer and ½, detects which one of the two lattice points a display device displays, the display device being connected to the straight line coordinate generator, and inputs the constant which designates the display of the same lattice point which the display device displays.

6. The straight line coordinate generator of claim 2, wherein the constant input means, when the reference coordinate is an integer and the judge coordinate is a sum of the integer and ½, detects which one of the two lattice points a software program displays, the software program using the straight line coordinate generator, and inputs the constant which designates the display of the same lattice point that the software program designates to display.

7. The straight line coordinate generator of claim 2, wherein the constant input means, when the reference coordinate is an integer and the judge coordinate is a sum of the integer and ½, is informed by a user which of the lattice points a program or a device displays, the program and the device being applied and connected to the straight line coordinate generator respectively, and inputs the constant which directs to display the same lattice point as the program or the device.

8. The straight line coordinate generator of claim 1 further comprising a constant registration means wherein the constant is registered according to each of eight combinations, said eight combinations being determined based upon whether the reference coordinate is the X coordinate or the Y coordinate and whether a relative X coordinate and a relative Y coordinate are positive or negative when the start point is set as a point of origin, wherein the constant input means detects from the constant registration means the constant for the XY coordinates of the start point and the end point, and inputs the detected constant to the constant holding means.

9. The straight line coordinate generator of claim 1, wherein the constant input means comprises a constant replacement means for replacing the constant held by the constant holding means with a second constant which indicates the display of a second lattice point, the constant replacing means replacing the constant held by the constant holding means whenever the judge coordinate equals the sum of the integer plus ½.

10. The straight line coordinate generator of claim 1, wherein the constant input means, when the reference coordinate is an integer and the judge coordinate is a sum of the integer and ½, detects which one of the two lattice points a display device displays, the display device being connected to the straight line coordinate generator, and inputs the constant which indicates the display of the same lattice point which the display device displays.

11. The straight line coordinate generator of claim 1, wherein the constant input means, when the reference coordinate is an integer and the judge coordinate is a sum of the integer and ½, detects which one of the two lattice points a software program displays, the software program using the straight line coordinate generator, and inputs the constant which indicates the display of the same lattice point that the software program indicates to display.

12. The straight line coordinate generator of claim 1, wherein the constant input means, when the reference coordinate is an integer and the judge coordinate is a sum of the integer and ½, is informed by a user which of the lattice points a program or a device displays, the program and the device being applied and connected to the straight line coordinate generator respectively, and inputs the constant which directs to display the same lattice point as the program or the device.

13. A method for drawing a straight line by displaying a lattice point of the line according to a Bresenham line drawing algorithm when XY coordinates of a start point and an end point of the line are given, the method comprising the computer-implemented steps of:

calculating a difference in absolute value between the X coordinate of the start point and the X coordinate of the end point, and a difference in absolute value between the Y coordinate of the start point and the Y coordinate of the end point;

comparing the differences in absolute value to determine which coordinate has a largest difference in absolute value and which coordinate has a smallest difference in absolute value, the coordinate with the largest difference in absolute value being designated a reference coordinate and the coordinate with the smallest difference in absolute value being designated a judge coordinate;

inputting a constant which indicates which one of two lattice points to display when the reference coordinate is an integer and the judge coordinate is a sum of the integer and ½, the two lattice points being located in a direction of a judge coordinate axis and are equally distant from the line, such that the line passes at a midpoint of the two lattice points;

storing the inputted constant;

computing each value of the Bresenham line drawing algorithm from the XY coordinates of the start point and the end point;

computing an error variable when the reference coordinate of a point is an integer, the error variable corresponding to a distance between the point and a lattice point which is placed near to the point by computing an error variable of a lattice point to be displayed first as indicated by the constant, and computing the error variable of a lattice point to be displayed next as indicated by the constant and the error variable of a preceding lattice point;

holding the computed error variable; and displaying a lattice point designated by the constant when the error variable indicates that the line passes at a midpoint of the two lattice points.

14. The method of claim 13, wherein the constant is inputted by selectively inputting one of two different constants, each constant designating the display of one of said two lattice points.

15. The method of claim 14 further comprising a step of registering the constant according to each of eight combinations, said eight combinations being determined based upon whether the reference coordinate is the X coordinate or the Y coordinate and whether a relative X coordinate and a relative Y coordinate are positive or negative when the start point is an original point, wherein the constant is inputted by determining which one of the eight combinations corresponds to the XY coordinates of the start point and the end point, finding the constant corresponding to the determined combination, and inputting the constant.

16. The method of claim 14, wherein the constant is inputted by replacing the constant with a second constant which indicates the display of a second lattice point, whenever the judge coordinate equals the sum of the integer plus ½.

17. The method of claim 14, wherein the constant is inputted, when the reference coordinate is an integer and the judge coordinate is a sum of the integer and ½, by detecting which one of the two lattice points a display device displays, the display device being connected to the straight line coordinate generator which employs the method, and inputting the constant which indicates the display of the same lattice point which the display device displays.

18. The method of claim 14, wherein the constant is inputted by, when the reference coordinate is an integer and the judge coordinate is a sum of the integer and ½, detecting which one of the two lattice points a software program displays, the software program using a straight line coordinate generator which employs the method, and inputting the constant which designates the display of the same lattice point that the software program designates to display.

19. The straight line coordinate generator of claim 14, wherein the constant is inputted by, when the reference coordinate is an integer and the judge coordinate is a sum of the integer and ½, a user, the user designating which of the lattice points a program or a device displays, the program and the device being applied and connected to straight line coordinate generator which employs the method respectively, and inputting the constant which directs to display the same lattice point as the program or the device.

* * * * *